(12) United States Patent  
Asikkala

(10) Patent No.: US 9,327,299 B2  
(45) Date of Patent: May 3, 2016

(54) APPARATUS AND METHOD FOR COATING SUBSTRATE

(75) Inventor: Kai Asikkala, Helsinki (FI)

(73) Assignee: BENEQ OY, Vantaa (FI)

( * ) Notice: Subject to any disclaimer, the term of this patent is extended or adjusted under 35 U.S.C. 154(b) by 149 days.

(21) Appl. No.: 13/516,481

(22) PCT Filed: Dec. 29, 2010

(86) PCT No.: PCT/FI2010/051096  
§ 371 (c)(1),  
(2), (4) Date: Jun. 15, 2012

(87) PCT Pub. No.: WO2011/080397  
PCT Pub. Date: Jul. 7, 2011

(65) Prior Publication Data  
US 2012/0258251 A1    Oct. 11, 2012

(30) Foreign Application Priority Data  
Jan. 4, 2010    (FI) .................. 20100005 U

(51) Int. Cl.  
B05C 5/02       (2006.01)  
B05B 17/00      (2006.01)  
B05B 1/00       (2006.01)  
B05D 1/02       (2006.01)  
B05B 7/00       (2006.01)  
B05B 13/02      (2006.01)  
B05B 7/04       (2006.01)  
B05B 15/04      (2006.01)  
(Continued)

(52) U.S. Cl.  
CPC ........... *B05B 7/0075* (2013.01); *B05B 13/0221* (2013.01); *B05B 15/0425* (2013.01); *B05C 5/0204* (2013.01); *B05B 7/0408* (2013.01); *B05B 7/0853* (2013.01); *B05B 7/1686* (2013.01); *B05B 15/0406* (2013.01); *C03C 2218/112* (2013.01); *Y02P 70/36* (2015.11)

(58) Field of Classification Search  
None  
See application file for complete search history.

(56) References Cited

U.S. PATENT DOCUMENTS

| | | |
|---|---|---|
| 4,504,526 A | 3/1985 | Hofer et al. |
| 4,871,105 A | 10/1989 | Fisher et al. |
| 5,069,157 A | 12/1991 | Imai et al. |

(Continued)

FOREIGN PATENT DOCUMENTS

| | | |
|---|---|---|
| CN | 1920096 A | 2/2007 |
| CN | 101111356 A | 1/2008 |

(Continued)

OTHER PUBLICATIONS

Apr. 12, 2011 Written Opinion of the International Searching Authority issued in International Patent Application No. PCT/FI2010/051096.

(Continued)

*Primary Examiner* — Dah-Wei D Yuan  
*Assistant Examiner* — Jethro M Pence  
(74) *Attorney, Agent, or Firm* — Oliff PLC

(57) ABSTRACT

An apparatus and a method for producing a liquid film from one or more liquid precursors onto the surface of a substrate in order to establish a coating, the apparatus being arranged to direct an aerosol flow against the surface of the substrate in a coating chamber. The apparatus includes a homogenizing nozzle for making the aerosol flow homogeneous substantially in the direction of the surface of the substrate prior to passing the flow into the coating chamber.

9 Claims, 4 Drawing Sheets

(51) Int. Cl.
*B05B 7/08* (2006.01)
*B05B 7/16* (2006.01)

(56) References Cited

U.S. PATENT DOCUMENTS

| | | | |
|---|---|---|---|
| 5,166,000 A | | 11/1992 | Singh et al. |
| 5,522,911 A | | 6/1996 | Terneu et al. |
| 6,112,554 A | | 9/2000 | Terneu et al. |
| 2008/0141936 A1* | | 6/2008 | Pui et al. ............ 118/629 |
| 2008/0145544 A1 | | 6/2008 | Schamberg et al. |

FOREIGN PATENT DOCUMENTS

| | | |
|---|---|---|
| EP | 0 415 253 A2 | 3/1991 |
| EP | 1757370 A2 | 2/2007 |
| EP | 1 978 067 A1 | 10/2008 |
| WO | 2009080896 A1 | 7/2009 |
| WO | WO 2009/080893 A1 | 7/2009 |
| WO | WO2009080896 * 7/2009 ............ B82B 1/26 |  |

OTHER PUBLICATIONS

Apr. 14, 2011 International Search Report issued in International Patent Application No. PCT/FI2010/051096.

Jul. 28, 2014 Extended Search Report issued in European Patent Application No. 10 840 643.0.

Dec. 23, 2014 Office Action issued in Chinese Patent Application No. 201080060514.6.

May 14, 2014 Office Action issued in Chinese Patent Application No. 201080060514.6.

* cited by examiner

APPARATUS AND METHOD FOR COATING SUBSTRATE

FIELD OF INVENTION

The invention relates to an apparatus for coating a substrate and, particularly, to an apparatus for producing a liquid film from one or more liquid precursors onto the surface of a substrate in order to establish a coating, said apparatus being arranged to direct an aerosol flow against the surface of the substrate in a coating chamber. The present invention further relates to a method for coating a substrate and, particularly, to a method for producing a liquid film from one or more liquid precursors onto the surface of a substrate to establish a coating, the method comprising the atomization of one or more precursors into droplets in order to generate an aerosol flow, passing the thus generated aerosol flow into a coating chamber and directing the aerosol flow in the coating chamber onto the surface of a substrate to establish a liquid film. Additionally, the present invention relates to the use of the method for coating a substrate.

BACKGROUND OF THE INVENTION

In the coating of different kinds of substrates, it is known to employ the application of a liquid layer onto the substrate surface. Herein, the substrate surface is covered with a liquid film that can be postprocessed in order to dry and cure the same. On such branch of conventional technology employing the application of a liquid layer on a substrate surface is manufacture of glass.

A glass substrate with an antireflection coating on its surface is used particularly in photovoltaic devices to improve the efficiency of solar cells. By virtue of reducing the reflection of solar radiation from the surface of the device, a larger portion of the solar energy can be passed to the active area of the solar cell, thus allowing a higher efficiency in converting solar energy into electrical energy. The antireflection coating must be as thin as possible to minimize absorption of solar energy therein. Furthermore, the refractive index of the antireflective material must be substantially smaller than the refractive index of the glass used as a substrate. The refractive index of glass is typically about 1.5.

Antireflection coatings cause interference between the wavefronts reflected from the bottom and top surfaces of the coating. When the reflected waves are suitably out-of-phase with each other, they tend to interfere subtractively thus substantially reducing the amount of reflected light. Optimal efficiency of antireflectivity is attained when the refractive index is adjusted to match that of the substrate glass material and, additionally, the thickness of the coating is set to one-quarter of the wavelength for which the antireflection coating intended. However, as solar radiation comprises a relatively wide band of wavelengths, conventionally a multilayer antireflection coating is employed to achieve maximal transmission efficiency. As to terms of practical embodiments with regard to production speed and costs, however, the most advantageous result is attained with a single-layer coating featuring a gradually changing refractive index from the glass surface to air. This arrangement minimizes reflection even for varying angles of incidence of solar radiation onto the surface of the solar cell. Such a situation occurs, e.g., when solar radiation is incident on a permanently fixed solar cell at different times of a day.

It is known in the art to coat a substrate by a coating material produced from a liquid precursor that after the application of the coating is cured into a solid state. Painting a substrate, for instance, fulfills the specifications of such a treatment. In applications that require a minimal thickness, advantageously less than 1 µm, and a high surface smoothness from the coating, conventional coating methods fail to provide a satisfactory result. Moreover, antireflective surfaces pose extreme demands with respect to the surface smoothness of the coating.

In patent publication U.S. Pat. No. 4,871,105, American Telephone and Telegraph Company, AT&T Bell Laboratories, Mar. 10, 1989, is described a method and an apparatus for applying a flux flow at the surface of a substrate. The apparatus comprises means for converting a liquid flow into a fog flow and then injecting the fog flow into a laminar gas flow, said laminar gas flow being directed at the bottom surface of the substrate being processed, whereby a portion of the flux droplet flow adheres to the substrate surface thus coating the substrate. The patent publication does not mention the size of fog flow droplets. However, it can be deduced from the components (Sono-Tek piezoelectric crystal, model 8700) used in the most preferred embodiment that the diameter of the fog droplet is greater than 10 µm. Hence, producing smooth, thin coatings applied by virtue of this kind of large-droplet fog flow is difficult.

As discussed above, a problem in prior-art embodiments is that conventional arrangements fail to produce a sufficiently thin and smooth liquid layer onto the surface of a substrate. A thick and uneven liquid layer results in an uneven coating. Moreover, a thick and uneven coating fails to give a maximally good antireflective coating.

SUMMARY OF THE INVENTION

It is an object of the invention to provide an apparatus and method such that are capable of overcoming the disadvantages of prior art. The goals of the present invention are achieved by virtue of an apparatus specifying that the apparatus comprises a homogenizing nozzle for making an aerosol flow substantially homogeneous in the direction of the substrate surface plane prior to passing the flow into the coating chamber. The goals of the present invention are further achieved by virtue of a method specifying that in the method the aerosol flow is made substantially homogeneous in the direction of the substrate surface plane prior to passing the flow into the coating chamber. Still further, the goals of the present method are achieved by the use of an elongated and tapering homogenizing nozzle for passing an aerosol flow uniformly into a coating chamber.

Preferred embodiments of the present invention are specified in the dependent claims.

The basic concept of the present invention is to produce droplets for an aerosol flow from at least one liquid precursor. Hereby, at least one precursor is advantageously converted into droplets having an average diameter less than 10 µm, advantageously less than 3 µm. The droplets are collected into an aerosol flow which is homogenized in a homogenizing nozzle according to the invention prior to passing the aerosol flow into a coating chamber. Most advantageously, the aerosol flow is set into a swirling or turbulent motion prior to its entry into the coating chamber. According to the invention, the aerosol flow can be directed by separate gas flows. The homogenizing nozzle is advantageously designed such that it homogenizes the aerosol flow substantially in the direction of the substrate surface. Accordingly, the homogenizing nozzle in one embodiment of the invention is implemented as an elongated channels that has a tapering cross section or height in the direction of the coating chamber.

By virtue of the homogenizing nozzle, the aerosol flow can be homogenized prior to passing the flow into the coating chamber and directing the same against the substrate surface. The aerosol flow comprising small droplets can be directed in a controlled fashion toward the substrate surface so as to apply a thin liquid layer of constant thickness thereon. Such a smooth and thin liquid layer the production of a thin and homogeneous coating on a substrate with the help of postprocessing the applied liquid layer.

BRIEF DESCRIPTION OF THE DRAWINGS

Next some preferred exemplary embodiments of the invention are described in more detail with the help of preferred embodiments and making reference to appended drawings in which.

DETAILED DESCRIPTION OF THE INVENTION

The present invention relates to an apparatus and method for coating a substrate, particularly a glass substrate with a liquid coating prior to the drying or curing steps of the coating, that is, prior to the postprocessing of the coating. Subsequent to the application of the coating layer, the postprocessing step can be carried out with the help of means specifically incorporated in the apparatus according to the invention for the purpose of subjecting the liquid coating to external energy such as, e.g., convective thermal energy or electromagnetic radiation such as infrared or ultraviolet radiation. In particular, the invention relates to coating a glass substrate with an antireflective coating.

Figure 1:
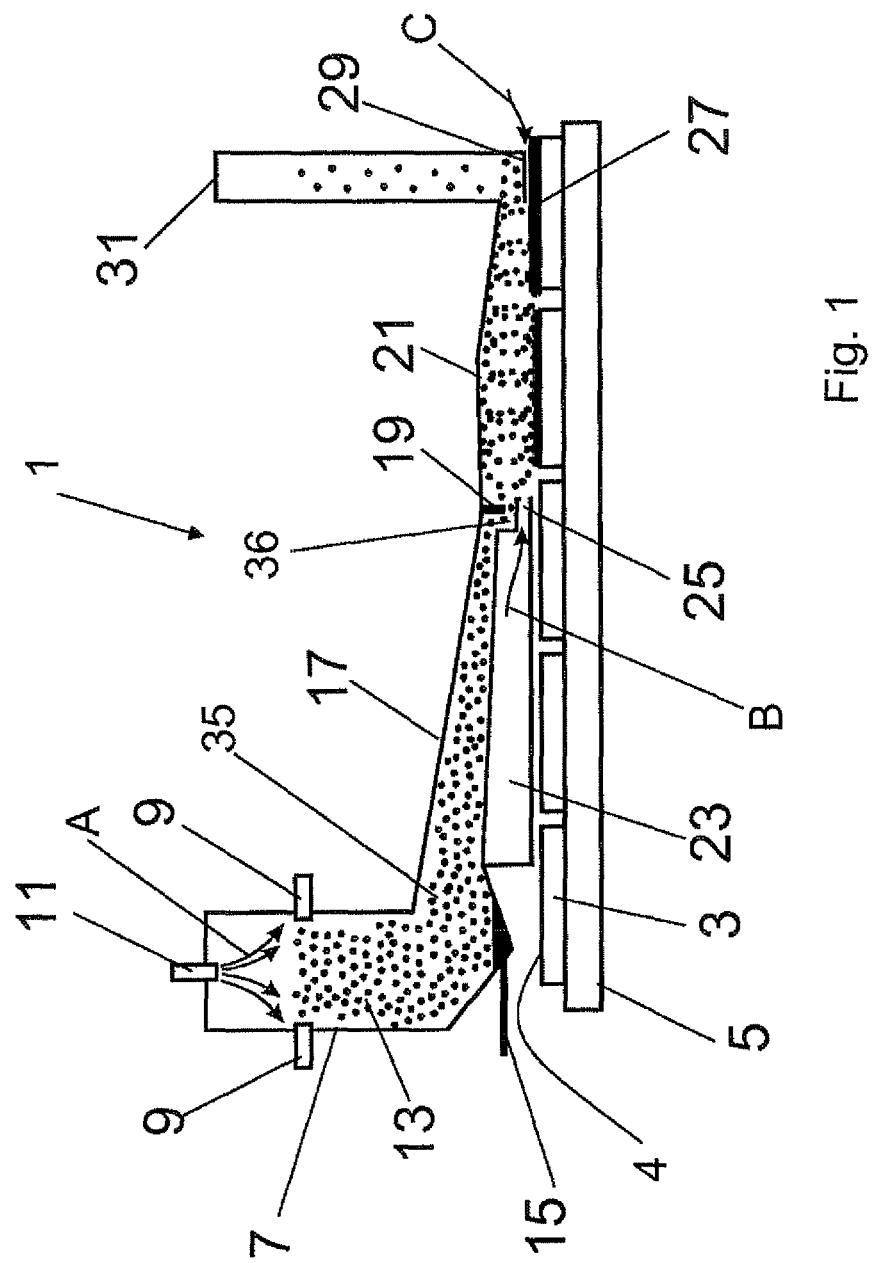
FIG. 1 shows a side elevation view of an embodiment of the apparatus according to the invention, wherein the atomized droplet flow is directed to the top surface of a glass substrate being coated.
Figure 2:
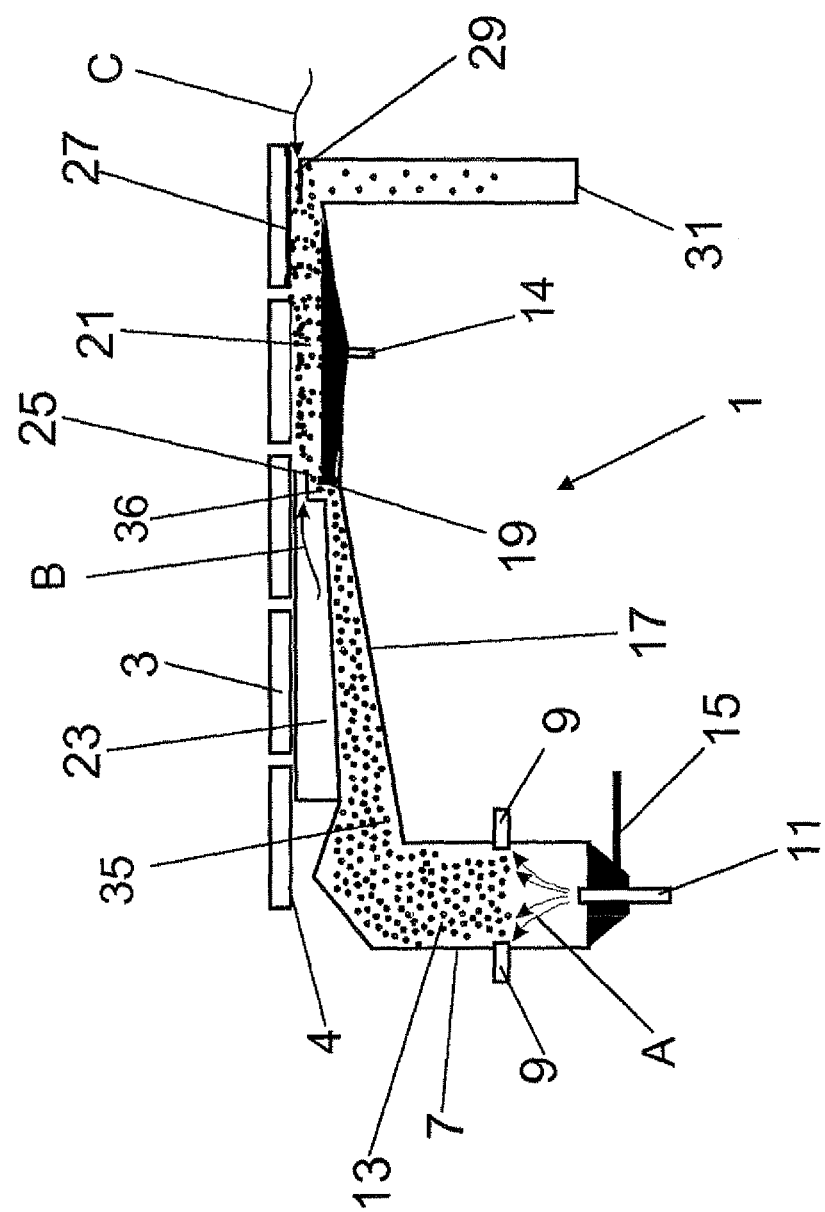
FIG. 2 shows a side elevation view of another embodiment of the apparatus according to the invention, wherein the atomized droplet flow is directed to the bottom surface of a glass substrate being coated.

In FIG. 1 is shown an embodiment of the apparatus 1 according to the invention comprising means 9 for atomizing a liquid precursor into droplets having advantageously an average diameter of less than 10 µm, more advantageously less than 5 µm and yet more advantageously less than 3 µm. Means 9 comprise one or more atomizers 9 adapted to convert one or more liquid precursors into small droplets of the kind mentioned above. In one embodiment of the present invention, apparatus 1 comprises at least one pair of mutually opposed atomizers 9 so aligned that the aerosol flows ejected therefrom impact with each other as shown in FIG. 1. The mutually opposed alignment of the atomizers provides a lower velocity of the combined aerosol flow. In an extreme case, this arrangement results in a practically stalled aerosol flow. This kind of a prior-art arrangement is described in international patent application WO2009/080893, filed by the applicant, Beneq Oy, on Feb. 7, 2009. In an alternative embodiment, the atomizers may arranged in some other fashion, whereby the apparatus may comprise one or more separate atomizers. In a preferred embodiment, the atomizers are gas-assist atomizers, wherein atomization of a liquid precursor takes place with the help of an assisting gas flow. Furthermore, in an alternative embodiment, the droplets or mist can be produced with the help of ultrasonic atomizers or other similar droplet spray generators capable of producing a sufficient flow of droplets of desired size. The atomizers 9 are advantageously placed in a separate atomizing chamber 7. The liquid precursor may be a precursor compound suited for the actual application. Additionally, the liquid precursor may contain a solvent that is evaporated during the coating process. The liquid precursor may further have such a composition that the liquid layer or liquid coating produced onto the surface 4 of substrate 3 includes at least one polymer component.

As described above, atomizers 9 produce in a atomizing chamber 7 an aerosol flow 13 that may further be controlled with the help of a gas flow A ejected from a guide gas nozzle 11. The gas flow A ejected from guide gas nozzle 11 may contain in an evaporated state the same solvent as that used in the liquid precursor. Thus, a controlled atmosphere is created into the atomizing chamber 7 for evaporation of the solvent contained in the droplets of the aerosol flow 13. The guide gas nozzle 11 may also be used for passing into the atomizing chamber some gas, advantageously of a kind that is nonreactive with regard to the droplets of aerosol flow 13. A portion of aerosol flow 13 adheres in the atomizing chamber 7 onto the inner walls thereof and flows along the walls to the bottom of the atomizing chamber 7, wherefrom the excess coating material can be recirculated via a return nozzle 15. While the recirculating means are omitted from the drawings for greater clarity, they essentially comprise a pump and a recirculated material container, advantageously complemented with a filter for cleaning the recirculated material free from solid particles.

Along the flow path of atomizing chamber 7 is adapted a homogenizing nozzle 17, whereto the aerosol flow 13 is passed from atomizing chamber 7. Directing the aerosol flow 13 into the homogenizing nozzle 17 may augmented, e.g., by the material flow ejected from guide gas nozzle 11. As shown in FIG. 1, the homogenizing nozzle 17 is implemented as an elongated channel comprising an inlet opening 35 for receiving the aerosol flow 13 and an outlet opening 36 for passing the aerosol flow 13 out from the homogenizing nozzle 17. Furthermore, the homogenizing nozzle 17 is shaped as a channel tapering toward the outlet opening 36 and, particularly, having a height tapering toward the outlet opening 36. Thus, the cross section of inlet opening 35 can be larger than the cross section of outlet opening 36. This kind of the elongated form and tapering cross section of homogenizing nozzle 17 in the flow direction of aerosol flow 13 achieves nonturbulence and homogenization of the aerosol flow 13.

As shown in FIG. 1, the apparatus 1 further comprises a coating chamber 21 communicating with the homogenizing nozzle 17 for passing the homogenized aerosol flow 13 from the homogenizing nozzle 17 to the coating chamber 21. In other words, the homogenizing nozzle 17 is adapted between the atomizing chamber 7 and the coating chamber 21 so that homogenization of the aerosol flow 13 takes place between the atomizing chamber 7 and the coating chamber and, more particularly, prior to passing the aerosol flow 13 to the coating chamber 21.

In coating chamber 21 the aerosol flow 13 is directed against the surface 4 of the substrate 3 in order to establish a liquid layer 27 onto the surface 4 of substrate 3. In other words, the aerosol flow 13 is passed from the outlet opening 36 of the homogenizing nozzle 17 into the coating chamber 21 in the form of a substantially steady and homogenized aerosol flow 13. In accordance with the above description, the homogenizing nozzle 17 is implemented as a channel tapering toward the coating chamber. In the embodiment of FIG. 1, the substrates 3 are arranged in the coating chamber 21 such that their top surfaces are essentially horizontally aligned. Then, the homogenizing nozzle 17 is implemented as a channel tapering toward the coating chamber 21. The salient feature of the present invention is evident in the arrangement of the homogenizing nozzle 17 that homogenizes the aerosol flow 13 substantially in the direction of the surface 4 of the substrate 3 prior to passing the flow to the coating chamber 21. To this end, the homogenizing nozzle 17 can be designed to cover the surface 4 of the substrate 3 substantially parallel to the direction thereof.

As shown in FIG. 1, the aerosol flow 13 or like fog flow undergoes homogenization in the homogenizing nozzle 17 in a plane substantially orthogonal to that of FIG. 1. The aerosol flow 13 is passed further to the coating chamber 21 connected after the homogenizing nozzle 17. Between the homogenizing nozzle 17 and the coating chamber 21 is advantageously adapted at least one flow control vane 19 that sets the aerosol flow 13 into a swirling or other turbulent motion. The flow control vane system 19 comprises at least one flow control vane 19 for inducing turbulence in the flow pattern of the aerosol flow 13 prior to passing the flow into the coating chamber 21 or, alternatively, just at the entrance point of the aerosol flow 13 into the coating chamber 21. In an embodiment of the invention, said at least one flow control vane 19 is adapted to the exit opening 36 of the homogenizing nozzle 17 or to a close vicinity thereof or, alternatively, substantially at the entrance of the coating chamber 21 or to a close vicinity thereof, in order to generate turbulence in the aerosol flow 13 within the coating chamber 21. Turbulence improves the mixing of the aerosol and thus enhances its even distribution onto the surface 4 of the substrate 3.

Operating in conjunction with the homogenizing nozzle 17 or upstream thereof in the flow direction of aerosol flow 13 may furthermore be adapted a droplet trap (not shown in the drawings) that serves to remove large droplets from the aerosol flow 13, whereby the size distribution of droplets being passed to the coating chamber can be controlled in a desired manner. Advantageously, the droplet trap is located to operate at the inlet opening 35 of the homogenizing nozzle 17 thus allowing separation of large droplets from the aerosol flow 13 prior to passing the flow to the homogenizing nozzle 17. The droplet trap may be, e.g., an impactor wherein large droplets of the aerosol flow 13 are removed by impacting them against the impaction plate of the impactor. In other words, the droplet trap can be implemented by way of placing an impaction plate at the inlet opening 35 of the homogenizing nozzle 17. Alternatively, a droplet trap can be placed into the atomizing chamber 7 or separation of large droplets can be implemented by directing the aerosol flow 13 in the atomizing chamber 7 to impinge on the wall of the atomizing chamber 7, whereby large droplets hit the wall of the atomizing chamber 7. Separation of large droplets from the aerosol flow 13 provides a more homogeneous aerosol flow 13 and thus allows the production of a more homogeneous coating.

Figure 3:
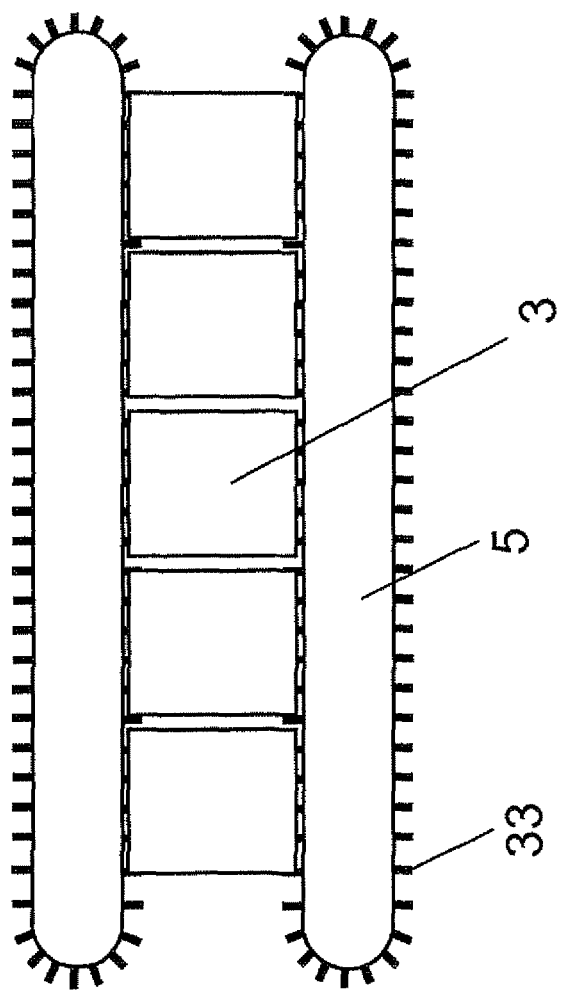
FIG. 3 shows a top view of the embodiment of FIG. 2 and conveyor means for transferring glass substrates.

In the embodiment of FIG. 1, the glass substrates 3 being coated are arranged to travel on a transfer platform or transfer means 5. In the interior of the coating chamber 21, a substantially wet coating or liquid layer 27 is deposited onto the surface of the substrates 3 when the aerosol flow 13 is directed against the surface 4 of the substrate 3. The liquid surface 27 is dried or cured with the help of separate means, e.g., thermal energy or electromagnetic radiation such as ultraviolet radiation in order to finalize the coating. In FIG. 3 is shown an embodiment for implementing the transfer platform or transfer means 5. The transfer means 5 incorporate substantially finger-like clamps 33 serving to support the glass substrate 3 from below or substantially at the vicinity of its edges. This kind of transfer arrangement is advantageous as it supports the glass substrate 3 essentially at its edge areas alone, whereby the glass substrate can be coated or otherwise processed on both sides without substantially making any contact with the coating or the substrate. Resultingly, contamination of the substrate surface is reduced.

Figure 4:
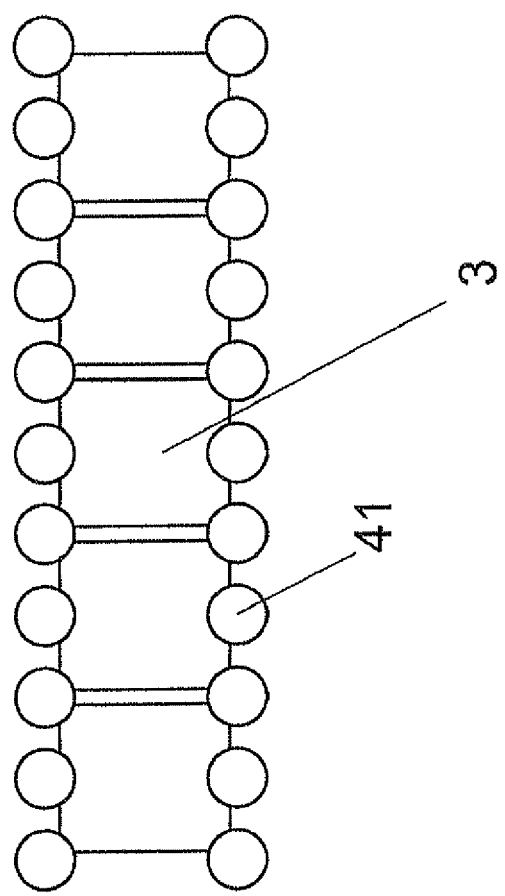
FIG. 4 shows an alternative embodiment of a conveyor mechanism for transferring glass substrates.

In FIG. 4 is shown an alternative arrangement for implementing the transfer means. In the embodiment shown in FIG. 4, at least some transfer elements of the transfer means comprise grooved wheels 41. The grooved wheels 41 are located so that they form two parallel rows of grooved wheels between which the glass substrate 3 extends as shown in FIG. 4. The grooved wheel 41 has a groove made on its periphery. The bottom angle of the groove can be 90° or smaller, advantageously smaller than 70° and most advantageously about 45°. With the help of the groove and its bottom angle, a planar glass substrate 3 can be readily controlled to a desired position in both vertical and horizontal directions. In other words, the grooves of the grooved wheels 41 automatically center the glass substrate 3 to the bottom of the groove, whereby the glass substrate 3 can transferred accurately and precisely along a desired track. The grooved wheels 41 are located to transfer the planar glass substrate 3 so the glass substrate 3 extends over the gap between the parallel rows of grooved wheels, whereby the edges of the glass substrate rest in the grooves of opposed grooved wheels 41. Hereby at least some of the grooved wheels 41 of either row or of both rows can be replaced by fixed driven wheels that are rotated by an external actuator. Respectively, at least some of the grooved wheels 41 of either row or of both rows can be idler wheels that can rotate freely when the glass substrate 3 is being transferred. The idling grooved wheels 41 may additionally be springedly loaded in the direction of the surface of the glass substrate 3 toward the center of the glass substrate 3. Then, the spring-loaded idling grooved wheels 41 press the glass substrate 3 at its edge toward the opposite grooved wheels 41.

With help of the grooved wheels 41 the substrate 3 can be transferred so that essentially only the cut edges of the glass substrate touch the transfer means. Hence, the use of grooved wheels 41 for moving the glass substrate 3 facilitates application of coating to both sides of the glass substrate without any risk of contaminating the glass substrate 3 during its transfer movement.

In the embodiment shown in FIG. 4, the glass substrate 3 is transferred in a horizontal position along a straight transfer track. Hereby the grooved wheels 41 are located so that axes of rotation are substantially vertically aligned, while the periphery or groove of the grooved wheels is substantially horizontally aligned. With the help of the grooved wheels 41 it is also possible to change the position of the glass substrate in such a manner that, e.g., the positions of successive grooved wheels 41 are slightly staggered relative to each other, whereby the position of the glass substrate 3 changes as the glass substrate 3 travels along the track moved by the grooved wheels. Resultingly, the glass substrate 3 can be rotated to, e.g, a vertical position under the guidance of the grooved wheels 41. In the light of this consideration, the grooved wheels 41 also allow transfer of the glass substrate in a vertical or tilted position or rotation of the same. A further benefit of using grooved wheels 41 is appreciated therein that they facilitate wide speed variations in the transfer movement since the glass substrate 3 does not slip under acceleration or braking as can take place in other transfer systems. The transfer speed of the glass substrate 3 is also easily adjustable by virtue of controlling the rotational speed of the driven wheels.

The apparatus 1 further comprises a barrier gas nozzle 25 and another barrier gas nozzle 29 for isolating the coating chamber 21 from the ambient atmosphere. In an alternative embodiment, the apparatus may comprise only one barrier gas nozzle or, alternatively, three or more barrier gas nozzles. In FIG. 1 the first barrier gas nozzle 25 is adapted to operate in conjunction with the outlet opening 36 of the homogenizing nozzle 17 in such a fashion that the first barrier gas nozzle 25 both isolates the coating chamber 21 from the ambient atmosphere and induces a transfer flow for guiding the aerosol flow 13 in the coating chamber 21. The first barrier gas nozzle 25 is further connected to a pressurized chamber 23 so the generate the barrier gas flow B. The barrier gas flow B exiting the barrier gas nozzle 25 may contain in an evaporated state the same solvent as is used in the liquid precursor. Hereby the coating chamber 21 becomes filled with a controlled gas atmosphere for the evaporation of the solvent contained in the droplets of the aerosol flow 13. As shown in FIG. 1, also the second bather gas nozzle 29 is arranged to isolate the coating chamber 21 from the ambient atmosphere. Also the gas flow C directed from the second barrier gas nozzle 29 may contain in an evaporated state the same solvent as is used in the liquid precursor.

The apparatus 1 further comprises a discharge channel 31 via which the portion of aerosol not adhered to the surface 4 of the substrates 3 is routed out from the coating chamber 21. By adjusting the differential pressure between the coating chamber 21 and the discharge channel 31, the retention time of the aerosol flow 13 can be controlled in the coating chamber 21.

In FIG. 2 is shown another embodiment of the apparatus 1 according to the invention for applying a liquid layer 27 to the bottom surface of the substrate 3. The apparatus of FIG. 2 is substantially equivalent to that shown in FIG. 1 with the exception that it is adapted for coating the underside of the substrate 3. All constructional and functional features discussed earlier are also applicable to the apparatus of FIG. 2. Also the apparatus shown in FIG. 2 is equipped with a discharge nozzle 14 since a portion of the droplets in the aerosol flow 13 adhere to the walls of the coating chamber 21 and drip therefrom to the bottom of the coating chamber 21, wherefrom the excess material can be recirculated via the return nozzle 14. While the recirculating means are omitted from the drawings for greater clarity, they essentially comprise a pump and a recirculated material container, advantageously complemented with a filter for cleaning the recirculated material free from solid particles. By performing the coating operation onto the underside of the substrate 3, the aerosol flow 13 can be advantageously used for gravitationally removing large droplets that are created by agglomeration or due to other reasons.

As described above, the present invention makes it possible to deposit a liquid film 27 from one or more precursors onto the surface 4 of a substrate 3 for the purpose of producing a coating. Liquid precursors are atomized with the help of one or more atomizers 9 into droplets forming an aerosol flow 13. The thus formed aerosol flow is passed into a coating chamber 21, wherein the aerosol flow is directed to the surface 4 of a substrate in order to establish a liquid film 27. According to the invention, the aerosol flow 13 is homogenized substantially in the direction the substrate surface prior to passing the flow into the coating chamber 21. In accordance with the invention, the flow is homogenized with the help of an elongated and tapering homogenizing nozzle 17, by virtue of which the aerosol flow is passed steadily into the coating chamber in which the aerosol flow is directed to the surface 4 of the substrate 3 for establishing a liquid film 27 required to produce a coating. The homogenizing nozzle 17 is implemented as a channel extending along the direction of the surface 4 of the substrate 3 in a tapering fashion toward the coating chamber 21. More particularly, the homogenizing nozzle tapers in its height, that is, in a dimension orthogonal to the surface 4 of the substrate 3.

To a person skilled in the art it is obvious that with advances in the art, the spirit of the invention can be implemented in a plurality of different ways. Hence, the present invention and its embodiments shall not be limited to the examples described above, but rather can be varied within the scope of the appended claims.

What is claimed is:

1. An apparatus for producing a liquid film from one or more liquid precursors onto a surface of a substrate in order to establish a coating, said apparatus being arranged to direct an aerosol flow onto the surface of the substrate, the apparatus comprising:

an atomizing chamber into which the one or more liquid precursors are atomized;

one or more atomizers adapted to atomize one or more liquid precursors for forming the aerosol flow, the one or more atomizers being arranged to the atomizing chamber for forming the aerosol flow into the atomizing chamber; and a coating chamber in which the aerosol flow is deposited onto the surface of the substrate, wherein the apparatus further comprises a homogenizing nozzle designed to homogenize the aerosol flow substantially in a direction of the surface of the substrate prior to passing the aerosol flow into the coating chamber, the homogenizing nozzle comprising an inlet opening for receiving the aerosol flow from the atomizing chamber and an outlet opening for passing the aerosol flow to the coating chamber, the homogenizing nozzle being arranged between the atomizing chamber and the coating chamber for passing the aerosol flow from the atomizing chamber to the coating chamber, and the homogenizing nozzle being an elongated channel arranged to extend parallel to the surface of the substrate from the inlet opening to the outlet opening of the homogenizing nozzle, wherein the elongated channel extends an entire length from the inlet opening to the outlet opening.

2. The apparatus of claim 1, wherein the homogenizing nozzle is implemented as a channel tapering toward the coating chamber.

3. The apparatus of claim 1, wherein the cross section of the inlet opening is made larger than the cross section of the outlet opening.

4. The apparatus of claim 1, wherein the apparatus comprises at least one flow control vane for inducing turbulence in the flow pattern of the aerosol flow.

5. The apparatus of claim 4, wherein said at least one flow control vane is adapted between the homogenizing nozzle and the coating chamber.

6. The apparatus of claim 4, wherein the at least one flow control vane is adapted to the outlet opening or its immediate vicinity.

7. The apparatus of claim 1, wherein the atomizing chamber incorporates at least one guide gas nozzle for guiding the aerosol flow to the homogenizing nozzle.

8. The apparatus of claim 1, wherein the apparatus further comprises one or more barrier gas nozzles for isolating the coating chamber substantially totally from the ambient atmosphere and guiding the aerosol flow in the interior of the coating chamber.

9. The apparatus of claim 1, wherein cooperating with the inlet opening of the homogenizing nozzle is arranged a droplet trap for separating large droplets from the aerosol flow.

* * * * *